| United States Patent Office | 3,552,812
Patented Jan. 5, 1971 |
|---|---|

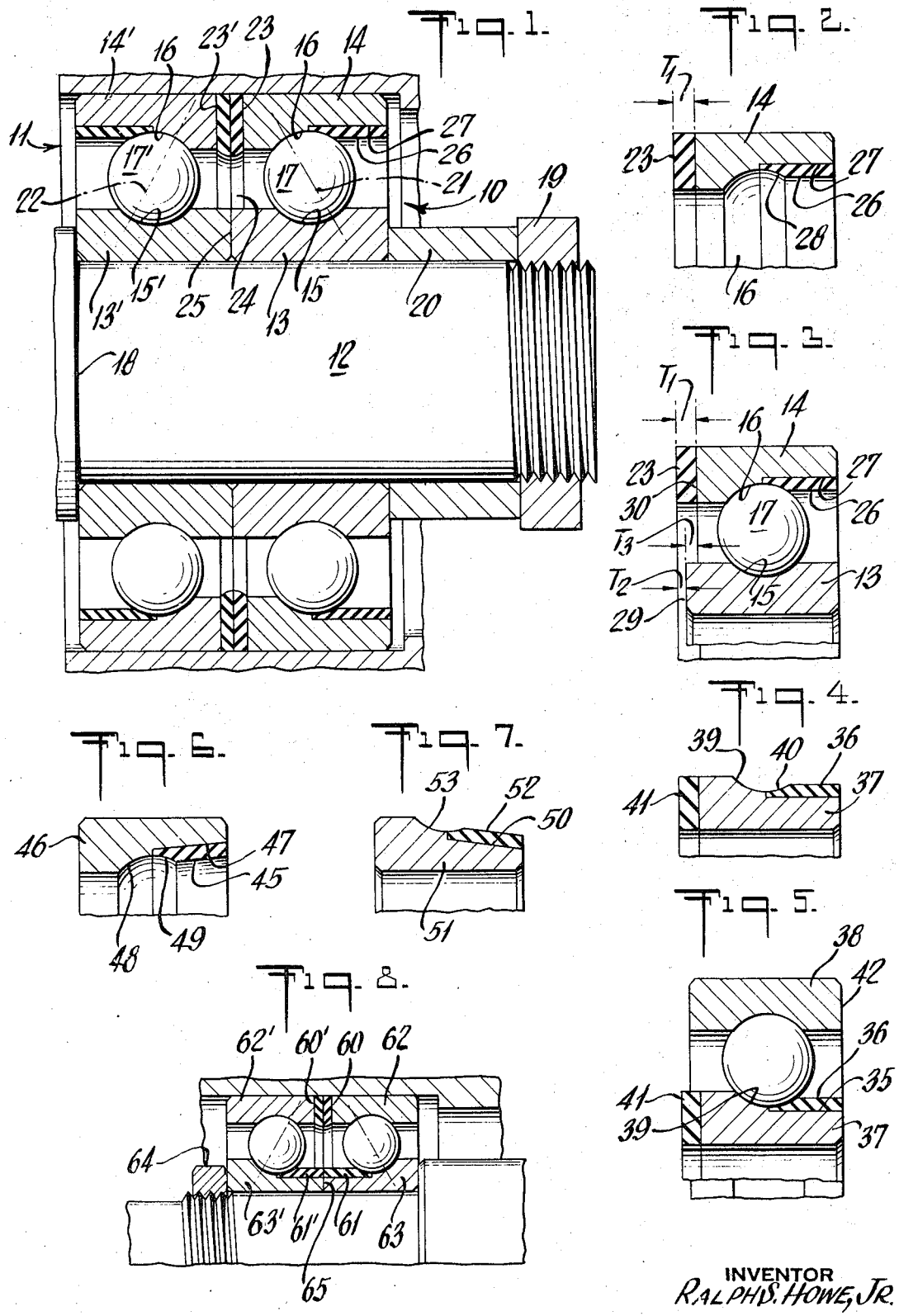

3,552,812
ANGULAR-CONTACT BEARING CONSTRUCTION
Ralph S. Howe, Jr., New Britain, Conn., assignor to Textron, Inc., Providence, R.I., a corporation of Delaware
Filed June 11, 1969, Ser. No. 832,354
Int. Cl. F16c *13/10*
U.S. Cl. 308—189
16 Claims

ABSTRACT OF THE DISCLOSURE

The invention contemplates an angular-contact ball-bearing construction in which the relieved side wall of one of the races embodies a circumferentially extending liner of resilient material. The resilient material radially straddles the circular intercept between the ball race and the radial plane containing the locus of centers of ball-race curvature. The resilient material deflects upon assembly of the rings and balls, into unit-handling relationship. The resilient material also retains the assembly against mechanical-shock damage. Various embodiments and various preloading techniques are described.

---

This invention relates to improved antifriction bearing constructions and is particularly applicable to ball-bearings of the so-called "angular-contact" variety.

In some kinds of angular-contact ball bearings, the side wall of one of the races is relieved or cut-away because the other side of the race takes substantially all the load, which has both radial and axial (thrust) components. The relief of the unloaded side wall permits ready assembly of a maximum complement of balls, without resort to local cut-outs or other special techniques which may upset the rotational balance of the bearing ring involved. But such angular-contact bearings present a problem of retaining their assembled relationship during shipment and other handling prior to ultimate installation and use; and in the course of such handling, any mechanical shock may be the cause of ball or race nicking, brinelling, or other damage.

In other kinds of angular-contact bearings, the relieved or unloaded side of a raceway is not relieved all the way to the radial plane of centers of raceway curvature, but special heating and/or cooling techniques must be employed to permit insertion of the desired ball complement, if the assembly is to be unit-handling. Of course, for such bearings, once they are assembled, there is no convenient means whereby they can be disassembled for inspection and servicing, and such bearings are also susceptible to the nicking and brinelling damage mentioned above.

It is, accordingly, an object of the invention to provide an improved angular-contact bearing construction.

Another object is to achieve the above object with a construction assuring unit-handling assembly without resort to special heating or cooling techniques.

A further object is to provide an improved angular-contact bearing construction with inherent resistance to mechanical damage to balls or races during shipment or other handling prior to ultimate installation and use, thus promoting quiet running and reduced susceptibility to failure.

It is also an object to achieve the foregoing objects with a construction which lends itself to ready disassembly, as for inspection and maintenance.

Still another object is to provide an angular-contact bearing inherently adaptable to a relatively wide tolerance range as to relative axial width of inner and outer rings, and as to out-of-flushness of inner and outer ring faces, to achieve angular-contact loading, particularly when such bearings are used in axially preloaded opposition on the same axis.

It is a general object to meet the foregoing objects with essentially simple structure which lends itself to efficient low-cost production of a precision product.

Other objects and various further features of the invention will be pointed out or will occur to those skilled in the art from a reading of the following specification in conjunction with the accompanying drawings. In said drawings which show, for illustrative purposes only, preferred forms of the invention:

FIG. 1 is a longitudinal sectional view of a floating pair of angular-contact bearings of the invention, mounted on a shaft in axially preloaded relation;

FIG. 2 is a fragmentary sectional view of the outer ring of one of the bearings of FIG. 1;

FIG. 3 is a similar fragmentary view of the bearing which includes the ring of FIG. 2;

FIGS. 4 and 5 are views corresponding respectively to FIGS. 2 and 3, but to illustrate an alternative arrangement;

FIGS. 6 and 7 are views corresponding respectively to FIGS. 2 and 4, but to illustrate further modifications; and FIG. 8 is a view similar to FIG. 1 to illustrate still another alternative.

Briefly stated, the invention contemplates an angular-contact ball-bearing construction in which the relieved side wall of one of the races embodies a circumferentially extending liner of resilient material. The resilient material radially straddles the circular intercept between the ball race and the radial plane containing the locus of centers of ball-race curvature. The resilient material deflects upon assembly of the rings and balls, into unit-handling relationship. The resilient material also retains the assembly against mechanical-shock damage. Various embodiments and various preloading techniques are described.

Referring to FIG. 1 of the drawings, the invention is shown in application to the construction of an angular-contact bearing assembly, comprising a matched pair of axially opposed duplicate assemblies or units 10–11 mounted upon the reduced end 12 of a shaft. Each bearing unit comprises inner and outer rings 13–14 with opposed raceways 15–16 accommodating a plurality of balls 17. Since the bearing units 10–11 are matched, the parts identification in the second unit 11 is given the same reference numerals as for unit 10, but with primed notation.

As installed in FIG. 1, the bearing units 10–11 are axially compressed at their inner rings, against a shoulder 18 on the shaft, by means of a nut 19 and spacer 20. The oppositely inclined phantom lines 21–22 suggest the resultant alignment of force sustained by the respective ball complements 17–17' when nut 19 is threaded up tight. Thus, the primary path of thrust reaction follows successively the nut 19, spacer 20, inner ring 13, balls 17, outer ring 14, outer ring 14', balls 17', inner ring 13' and shoulder 18.

In accordance with a feature of the invention, larger tolerance in the relative axial width of inner and outer rings for a particular bearing unit are achieved by forming one of the bearing-ring end walls (in the described chain of thrust reaction) with a bonded resilient ring which in its unstressed state makes that ring face protrude axially beyond the face of the other ring of the same bearing unit. Thus, for the assembled relationship shown in FIG. 1 wherein the abutting end walls of the outer rings 14–14' embody such resilient members 23–23', the latter will have been compressed, as suggested by a radial bulge at 24. This bulge will be understood to signify a desired magnitude of preload limit for the respective bearing units 10–11. By so devising the placement of the adjacent end walls of inner rings 13–13', with respect to the stiffness, bulk and placement of the resilient members 23, assurance may be had that however tightly an installer may take up the nut 19 to the point of inner-ring abutment at 25, the preloading members 23–23' will have assured the intended axial preload of the bearing units. It will be appreciated that, depending upon the yieldability of the members 23–23', a relatively wide range of tolerance is possible for the end-wall dimensioning of both rings, while assuring safe take-up of preload.

In accordance with another feature of the invention, each of the bearing units 10–11 is unit-handling, and may be assembled with as full a complement of balls as is desired. This feature is achieved by applying a liner 26 of resilient material to one of the rings of a bearing unit. The liner 26 defines one sidewall of a raceway and is preferably substantially only on the axial side of its bearing ring remote from that side which sustains running load; also, the liner 26 preferably radially straddles the intercept between the associated raceway and the radial plane which contains the locus of race centers of ball-race curvature for that raceway. Thus, the liner 26 may be received in a counterbore 27 in the outer ring 14, and the counterbore may extend substantially to the said plane of race centers; preferably, however, the counterbore extends just short of said plane.

The particular construction described for outer ring 14 may be better understood by reference to FIGS. 2 and 3. In the form there shown, the counterbore 27 is generally cylindrical, and is at a radius greater than the maximum radius of the adjacent raceway 16. Preferably, the resilient liner 26 is molded directly to the ring 14, and therefore the counterbore 27 need not be ground, and in fact is preferably not specially finished, because bonding effectiveness may be thereby enhanced. Also, preferably, the inner exposed surface of the liner 26 is finished in the region of adjacency with the raceway 16 so as substantially to conform with continuation of the raceway contour; this relation is suggested at 28. With the structure thus described, it will be seen that assembly with the desired full complement of balls 17 is effected by axially applying the resiliently lined end of the outer ring 14 over the set of balls 17 within raceway 15. In the process of such axial insertion, the liner 26 yields locally to permit ball passage, without nicking or other damage to the balls or races, and the assembly is self-retaining when the balls 17 are accommodated in the outer raceway 16.

To complete the description of FIGS. 2 and 3, the resilient preloading end member 23 is seen to have an axial thickness $T_1$, in the unstressed state, to position the axial exposed end face thereof beyond the corresponding end face 29 of the inner ring 13 (i.e., assuming the condition when end play of the bearing has been taken up); the amount of this axial offset is designated $T_2$ in FIG. 3. Also designated in FIG. 3 is the amount $T_3$ by which the rigid outer end face 30 of outer ring 14 is offset axially inwardly of the placement of the corresponding end wall 29 of ring 13. Obviously, by controlling the extent of the inward offset $T_3$, with respect to the outward offset $T_2$, and by appropriate selection of resilient material at 23, for the particular radial extent of membe 23, a wider ange of selection is available for providing design preload in the bearing of FIG. 3 when mounted as described in FIG. 1.

FIGS. 4 and 5 illustrate a modification of the embodiment of FIGS. 1 to 3 in that the recess 35, which accommodates the resilient liner 36, is formed in the inner bearing ring 37, while the outer bearing ring 38 is of standard configuration. Again, however, the radial extent of the liner 36 straddles the intercept of the adjacent raceway 39 with the radial plane of raceway centers of curvature, and as described for the embodiment of FIGS. 1 to 3, the curvature of liner 36 in the region adjacent raceway 39 is preferably in substantial conformance with the raceway curvature, as suggested at 40 in FIG. 4.

FIGS. 4 and 5 also illustrate that the described resilient preloading feature may be achieved by bonding a preload member 41 to the thrust-load-sustaining end wall of the inner bearing ring 37. The discussion in connection with FIG. 3, as to thickness of the preload washer 23 in relation to offset location of corresponding bearing-ring end walls is equally applicable to the preload member 41 in FIG. 5. Preferably, bearings as illustrated in FIG. 5 are used in a situation in which it is the outer rings of a matched pair of bearings which are clamped into rigid abutment so that compressed adjacent preload members 41 may assure the desired level of preload.

FIG. 6 illustrates a modification of the liner structure described for FIG. 2, wherein the liner 45 is embodied in an outer bearing ring 46, being preferably molded or otherwise bonded into the recess or counterbore 47 in the relieved side of the raceway 48. However, as distinguished from FIG. 2, the recess or counterbore 47 is generally frustoconical and is characterized by a flare which diverges from the opposed ring, in the axial direction away from the raceway 48. The same flare also characterizes the exposed generally conical surface of the liner 45 and, again, the liner 45 radially straddles the intercept of the raceway 48 with the radial plane of race-curvature centers. Also, again, the exposed surface of liner 45 in the region 49 of adjacency to the race 48 is preferably finished to generally the same curvature as that of the race. The form of FIG. 6 will be seen to provide, through the flared region, a ramp or wedge action by which assembly, as already described, may be facilitated.

The arrangement of FIG. 7 corresponds to that of FIG. 6, except that it illustrates application of the flared recess 50 to an inner bearing ring 51, and the resilient liner 52 follows the flare of the recess 50 but nevertheless radially straddles the intercept at the bottom of the raceway 53, as previously discussed. The same simplified assembly results from the ramp structure of FIG. 7.

FIG. 8 illustrates that the preloading resilient members 60–60' of a particular matched pair of bearing units of the invention need not be employed on the same bearing ring as that which embodies the resilient lining 61–61'. Thus, in FIG. 8 the preload members 60–60' are embodied in the abutting end-wall structure of the outer bearing rings 62–62', and the resilient liners 61–61' are embodied in adjacent relieved portions of inner bearing rings 63–63'. Mounting is otherwise substantially as described for FIG. 1, it being understood that desired preload is assured when the nut 64 is driven to the point of inner-ring contact at 65.

It will be seen that I have described improved angular-contact bearing structures wherein unit-handling relation of bearing units may be assured, while at the same time there is the further assurance against damage due to carelessness in handling prior to ultimate installation. The unit-handling relationship is achieved without resort to thermal expansion or shrinking techniques, and disassembly is achievable when desired for inspection or maintenance merely by axial separation of the rings against the resilient action of the liner. Further savings are realized by reducing the amount of grinding required in the ring which contains the relief of the resilient liner, and the same grinding operation which finishes the raceway of the relieved ring may also finish off any resilient material of the liner which may otherwise have been in the path of ultimate ball motion in the bearing. This technique of finishing the liner and associated raceway assure that when preload is applied to the bearing, the small resultant axial shift in bearing rings will position the balls inherently out of contact with the liner, so that operation of the preloaded bearing is unimpaired by the liner.

While the invention has been described in detail for the preferred forms shown, it will be understood that modifications may be made within the scope of the claims. In particular, it will be understood that the claim language, which defines the axial extent of a raceway as being limited primarily to one axial side of the radial plane of centers of ball-race curvature, is intended to include coverage of constructions in which the liner may extend axially short of this radial plane.

What is claimed is:

1. An angular-contact antifriction bearing comprising inner and outer rings having opposed ball raceways, balls in said raceways supporting said rings in radially spaced relation, one of said raceways being of axial extent limited primarily to one axial side of the radial plane containing the locus of centers of its ball-race curvature, the particular ring having said one raceway having a circumferentially continuous recess extending axially from substantially said radial plane and on the other axial side of said radial plane, and a circumferentially extending member of resiliently yieldable material received in said particular ring in the circumferential recess thereof, said member extending axially into adjacency with said limited raceway and extending into slight radially interfering relation with the axial path of the ball-insertion movement from axial overlap with said member and into the raceway of said particular ring, whereby said member serves to facilitate and retain in unit-handling relation an assembly of the desired ball complement in said bearing.

2. The bearing of claim 1, in which said particular ring is said outer ring.

3. The bearing of claim 1, in which said particular ring is said inner ring.

4. The bearing of claim 1, in which said member is bonded to said particular ring.

5. The bearing of claim 1, in which said member is of elastomeric material.

6. The bearing of claim 1, in which the recess of said particular ring is of axially extending generally cylindrical contour.

7. The bearing of claim 1, in which the recess of said particular ring is of axially extending generally frustoconical contour, diverging from the opposed ring in the axial direction away from said radial plane.

8. The bearing of claim 1, in which the exposed axially extending surface of said member is generally cylindrical.

9. The bearing of claim 1, in which the exposed axially extending surface of said member is of generally frustoconical contour, diverging from the opposed ring in the axial direction away from said radial plane.

10. The bearing of claim 1, in which the axial distance from said radial plane to the axial end of said particular ring on the raceway side of said plane is less than the axial distance from the corresponding plane of the other ring to the corresponding axial end of said other ring, and an annular member of resilient material permanently bonded to said axial end of said particular ring, the unstressed axial thickness of said annular member exceeding the difference between said axial distances.

11. The bearing of claim 1, in which the axial distance from said radial plane to the axial end of said particular ring on the recessed side of said plane is greater than the axial distance from the corresponding plane of the other ring to the corresponding axial end of said other ring, and an annular member of resilient material permanently bonded to said axial end of said other ring, the unstressed axial thickness of said annular member exceeding the difference between said axial distances.

12. As an article of manufacture, an annular antifriction bearing ring having inner and outer generally cylindrical surfaces with a circumferentially continuous ball-raceway in one of said surfaces, said raceway being of axial extent limited primarily to one axial side of the radial plane containing the locus of centers of ball-race curvature, said ring also having a circumferentially continuous recess extending axially from substantially said radial plane and on the other axial side of said radial plane, and a circumferentially extending member of resiliently yieldable material received in the recess, said member extending axially into adjacency with said raceway and extending radially into slight radially interfering relation with the geometric axial projection of the intercept of said raceway at said radial plane.

13. An angular-contact antifriction bearing comprising inner and outer rings having opposed ball raceways, balls in said raceways supporting said rings in radially spaced relation, the raceway of one of said rings being of an axial extent which is predominantly on one axial side of the radial plane containing the locus of centers of its ball-race curvature, the axial distance from said radial plane to the axial end of said one ring on the predominantly raceway side of said plane being less than the axial distance from the corresponding plane of the other ring to the corresponding axial end of the other ring, and an annular member of resilient material permanently bonded to said axial end of said particular ring, the unstressed axial thickness of said annular member exceeding the difference between said axial distances.

14. An angular-contact antifriction bearing comprising inner and outer rings having opposed ball raceways, balls in said raceways supporting said rings in radially spaced relation, the raceway of one of said rings being of an axial extent which is predominantly on one axial side of the radial plane containing the locus of centers of its ball-race curvature, the axial distance from said radial plane to the axial end of said one ring on the side of said plane opposed to the predominant raceway side being greater than the axial distance from the corresponding plane of the other ring to the corresponding axial end of said other ring, and an annular member of resilient material permanently bonded to said axial end of said other ring, the unstressed axial thickness of said annular member exceeding the difference between said axial distances.

15. An angular-contact antifriction bearing comprising inner and outer rings having opposed ball raceways, balls in said raceways supporting said rings in radially spaced relation, the raceway of one of said rings being of an axial extent which is predominantly on one axial side of the radial plane containing the locus of centers of its ball-race curvature, a circumferentially extending lining of resilient material bonded to said one ring axially adjacent the raceway thereof and predominantly on the other axial side of said radial plane, the radial thickness of said resilient material stradding the intercept of said raceway with said plane, and said lining being contoured substantially continuously with substantially the same curvature as that of the ball race of said one ring, whereby said balls may be axially assembled into unit-handling relation with said rings through deflection of said liner, with resilient retention against axial play prior to ultimate installation and use, and yet when subjected to the slight axial displacement which is characteristic of angular-contact load against the raceway of said one ring, the path of ball movement will be clear of contact with said liner.

16. As an article of manufacture, an inner raceway element for assembly into an outer raceway ring with plural balls riding the raceways, said element including a circumferentially continuous concave external raceway surface of axial extent limited primarily to one axial side of the radial plane containing the locus of centers of ball-race curvature, said element also having a circumferentially continuous recess extending axially from substantially said radial plane and on the other side of said radial plane, and a circumferentially extending member of resiliently yieldable material received in the recess, said member extending axially into adjacency with said raceway and extending radially into slight radially interfering relation with the geometric axial projection of the intercept of said raceway at said radial plane.

References Cited
UNITED STATES PATENTS 3,056,636  10/1962  Mims _____ 308—196

FRED C. MATTERN, JR., Primary Examiner

F. SUSKO, Assistant Examiner